(12) United States Patent
Dor et al.

(10) Patent No.: US 9,111,466 B2
(45) Date of Patent: Aug. 18, 2015

(54) EFFICIENT ACCESS TO CONNECTIVITY INFORMATION USING CABLE IDENTIFICATION

(71) Applicant: Mellanox Technologies Ltd., Yokneam (IL)

(72) Inventors: Shachar Dor, Rosh Ha'ayin (IL); Pazit Goldman, Ma'ayan Zvi (IL); Eyal Baruch, Pardes Hana (IL)

(73) Assignee: MELLANOY TECHNOLOGIES LTD., Yokneam (IL)

( * ) Notice: Subject to any disclaimer, the term of this patent is extended or adjusted under 35 U.S.C. 154(b) by 414 days.

(21) Appl. No.: 13/743,364

(22) Filed: Jan. 17, 2013

(65) Prior Publication Data

US 2014/0201260 A1 Jul. 17, 2014

(51) Int. Cl.
| | |
|---|---|
| *G06F 15/173* | (2006.01) |
| *G09F 3/00* | (2006.01) |
| *H01R 13/64* | (2006.01) |
| *H01R 13/66* | (2006.01) |
| *H01R 13/46* | (2006.01) |
| *H01R 24/64* | (2011.01) |
| *H04W 4/00* | (2009.01) |

(52) U.S. Cl.
CPC .............. *G09F 3/0297* (2013.01); *H01R 13/64* (2013.01); *H01R 13/665* (2013.01); *H01R 13/465* (2013.01); *H01R 24/64* (2013.01); *H04W 4/008* (2013.01)

(58) Field of Classification Search
CPC ................... G02B 2027/0178; G02B 27/017; G06F 3/013; G06F 3/005; G06F 3/011
See application file for complete search history.

(56) References Cited

U.S. PATENT DOCUMENTS

| | | | |
|---|---|---|---|
| 8,010,999 B2 | 8/2011 | Fujita et al. | |
| 2004/0065470 A1* | 4/2004 | Goodison et al. ............. | 174/112 |
| 2004/0065741 A1 | 4/2004 | Reddersen et al. | |
| 2004/0118925 A1 | 6/2004 | Kelly et al. | |
| 2007/0004241 A1* | 1/2007 | Meier et al. ...................... | 439/67 |
| 2008/0172722 A1* | 7/2008 | Fujita et al. ........................ | 726/4 |
| 2008/0314979 A1 | 12/2008 | Johnsen et al. | |
| 2008/0318465 A1* | 12/2008 | Johnsen et al. ............... | 439/488 |
| 2010/0176962 A1* | 7/2010 | Yossef ..................... | 340/815.45 |
| 2012/0187964 A1* | 7/2012 | Michaelis et al. ............. | 324/679 |
| 2014/0105029 A1* | 4/2014 | Jain et al. ...................... | 370/242 |

FOREIGN PATENT DOCUMENTS

| | | |
|---|---|---|
| JP | 05161224 A2 | 6/1993 |
| JP | 2006271154 A | 10/2006 |

* cited by examiner

*Primary Examiner* — Peling Shaw
(74) *Attorney, Agent, or Firm* — D. Kligler I.P. Services Ltd.

(57) ABSTRACT

Communication apparatus includes a memory and a communication interface, configured to send and receive messages to and from respective management agents in multiple items of communication equipment having ports that are interconnected by cables in a network, each of the cables having a unique identifier. A processor is configured to communicate with the management agents via the communication interface so as to collect physical connectivity information with respect to the cables and the ports, to store the physical connectivity information in the memory, and to provide the physical connectivity information to a user of the apparatus.

20 Claims, 3 Drawing Sheets

EFFICIENT ACCESS TO CONNECTIVITY INFORMATION USING CABLE IDENTIFICATION

FIELD OF THE INVENTION

The present invention relates generally to computing and communication systems, and particularly to cabling infrastructure used in such systems.

BACKGROUND

Large-scale modern data centers can have hundreds of equipment racks filled with switches, network appliances and computing nodes, connected by thousands of cables, cumulatively spanning many miles. Maintaining the infrastructure in such a data center poses major challenges, not the least of which is the difficulty of ensuring that all cables are and remain properly connected, and identifying and repairing connectivity faults when they occur.

A number of means have been proposed to support automatic identification of cables by the equipment to which they are connected. For example, some types of cable terminations may contain a memory chip, such as an EEPROM chip, in which identifying information is stored in a fashion that can be read automatically by the connected equipment. This sort of facility is specified, inter alia, by the Quad Small Form Factor Pluggable (QSFP) interconnect standard, in which an EEPROM in the transceiver module within the connector at the end of the cable contains information regarding the cable, including an optional serial number assigned by the vendor.

Cable identification information may also be fixed to the end of the cable in a manner that can be read externally. For example, U.S. Pat. No. 8,010,999 describes a cable installation support and management system, in which each worker downloads operation information, to support operations on cables authorized for use, onto a portable terminal carried by the worker. The operation information is associated in advance with cable identification information and is provided by a server. Using a reading device of the portable terminal, the worker reads cable identification information from a cabling data card, such as an RFID tag or a printed barcode, that is attached to the end of a cable. Based on the cable identification information, the worker acquires operation information about the appropriate cable from the downloaded operation information and displays the acquired operation information on the display device of the portable terminal.

As another example, U.S. Patent Application Publication 2008/0314979 describes a cable management system in which machine-readable labels are applied to cable connectors and chassis component connectors. In order to monitor connectivity of cabling, the machine-readable labels on a cable connector and a chassis component to which the cable connector is connected are scanned, and the scanned connectivity information is recorded.

SUMMARY

Embodiments of the present invention provide improved methods and apparatus for identifying cables and managing connectivity information.

There is therefore provided, in accordance with an embodiment of the present invention, a cable for conveying communication signals between endpoints. The cable includes connectors for respective connection to the endpoints and a plurality of labels containing a code that uniquely identifies the cable in a machine-readable format. The labels are disposed along a length of the cable and include at least one label at a location that is at least 50 cm away from any of the connectors of the cable.

In a disclosed embodiment, the at least one label includes multiple labels disposed along the cable at regular intervals, and the labels include a barcode. Typically, the plurality of the labels includes end-labels that are disposed respectively adjacent to the connectors, while in some embodiments, the cable includes electronic components that are connected to the connectors and contain the code in an electronic format that is readable by equipment at the endpoints to which the connectors are connected.

There is also provided, in accordance with an embodiment of the present invention, communication apparatus, including a memory and a communication interface, configured to send and receive messages to and from respective management agents in multiple items of communication equipment having ports that are interconnected by cables in a network, each of the cables having a unique identifier. A processor is configured to communicate with the management agents via the communication interface so as to collect physical connectivity information with respect to the cables and the ports, to store the physical connectivity information in the memory, and to provide the physical connectivity information to a user of the apparatus.

Typically, the physical connectivity information indicates, responsively to the unique identifier, which of the cables is connected to each of the ports. In a disclosed embodiment, the processor is configured to detect, responsively to a message from the management agents, a change in a connection of a cable to a port in the network, and to issue an alert to the user of the change.

In some embodiments, the messages include management data packets, which are transmitted over the cables in the network in order to convey the physical connectivity information to the communication interface. The management data packets may be Link Layer Discovery Protocol (LLDP) frames or Management Datagram (MAD) packets.

The apparatus may also include a handheld client device, which is operable by the user to read the unique identifier of a cable in the network, to communicate the unique identifier over the air to the processor, and to receive over the air from the processor and to display the physical connectivity information with respect to the cable. Typically, the handheld client device is configured to read the unique identifier from a machine-readable label on the cable. In one embodiment, the processor is configured to receive the unique identifier of the cable read in a vicinity of a first end of the cable, which is found to be disconnected while a second end of the cable is connected at a location unknown to the user, and the physical connectivity information provided to the client device in response to the unique identifier includes port information selected from a group consisting of a first port to which the first end of the cable should be connected and a second port to which the second end of the cable is connected.

There is additionally provided, in accordance with an embodiment of the present invention, a method for communication, which includes sending and receiving management messages between a computerized fabric manager and respective management agents in multiple items of communication equipment having ports that are interconnected by cables in a network, each of the cables having a unique identifier, so as to collect in the fabric manager physical connectivity information with respect to the cables and the ports. The physical connectivity information is stored in a memory of the fabric manager and is provided to a user.

The present invention will be more fully understood from the following detailed description of the embodiments thereof, taken together with the drawings in which:

DETAILED DESCRIPTION OF EMBODIMENTS

In today's large data centers, network equipment is often covered by dense wiring, and it may be difficult for management and maintenance personnel to know which switch they are looking at and to which port and device each cable end connects. By the same token, it can be hard to keep track of changes in wiring (whether authorized or unauthorized), particularly changes in redundant and backup links that might have no immediate operational effect but can later cause severe problems.

Automated network management solutions that are known in the art typically rely on information obtained from higher-layer protocols in discovering the physical connectivity of the network. As a result, it may be difficult or impossible for the network management system to obtain physical connectivity information when the necessary higher-layer protocols are not active. Furthermore, the system may be unable to distinguish between physical connectivity, as it actually exists in the physical layer, and logical connectivity that can be created at higher layers, whereby multiple physical links may be combined into a link aggregation group (LAG) or trunk.

Embodiments of the present invention that are described hereinbelow provide two complementary solutions to these difficulties: cables with unique, machine-readable identifiers, accessible both by the equipment to which they are connected and by handheld devices used by maintenance personnel; and an automated fabric manager, which collects, stores, and reports physical connectivity information, indicating which cable connects to which port on which device. This connectivity information may be collected either over a management network, independently of upper-layer protocols, or using in-band management data packets provided by the applicable link-layer protocol, which are specially defined to convey the connectivity information. The fabric manager can alert the user whenever cabling is modified at any endpoint (meaning that a different cable has been connected to a given port, or a given cable was reconnected to a different port).

Some of these embodiments provide means for quickly providing the user with information about the port and device to which any given cable is connected, based on the physical identification of the cable. Such cables are provided with labels containing a code that uniquely identifies the cable in a machine-readable format. The labels are disposed along the length of the cable, spaced apart by about 50 cm, for example, and not only at the ends of the cable, adjacent to the connectors. The user can read any of these labels automatically using a hand-held client device, which then communicates over the air with the fabric manager to obtain complete information regarding the particular cable and its connections. It is thus possible to identify and work with cables without first having to find the ends of the cables, which may be difficult to trace and access.

Figure 1:
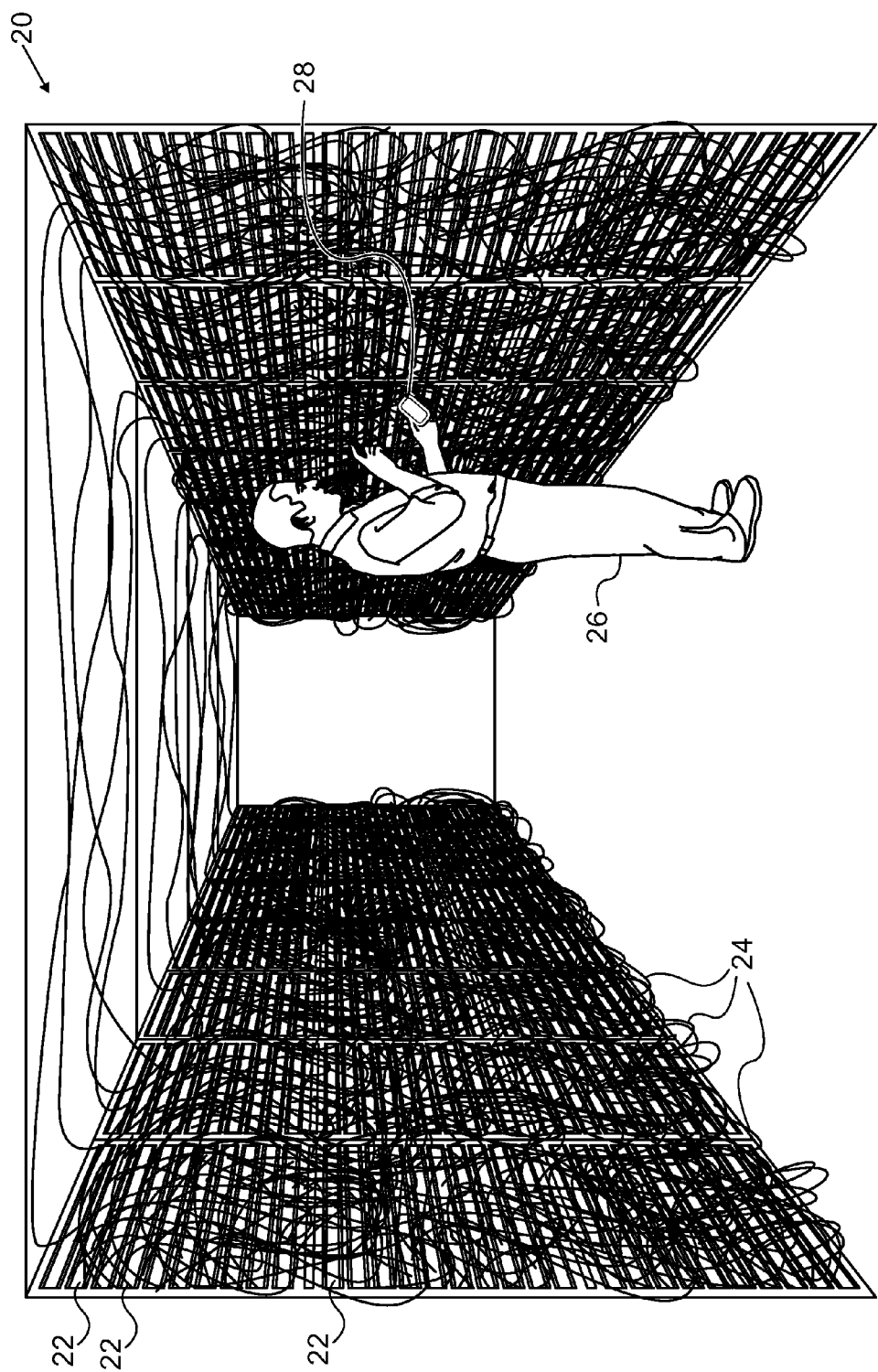
FIG. 1 is a schematic, pictorial illustration of the operation of a cabling management system in a data center network, in accordance with an embodiment of the present invention.

FIG. 1 is a schematic, pictorial illustration of the operation of a cabling management system in a data center network 20, in accordance with an embodiment of the present invention. Network equipment 22 in multiple racks is interconnected by cables 24, typically high-bandwidth electrical or optical cables. This figure illustrates, in small measure, the difficulty that may be encountered by a user 26, such as a maintenance technician or engineer, in identifying the cables and their respective connectivity.

Figure 2:
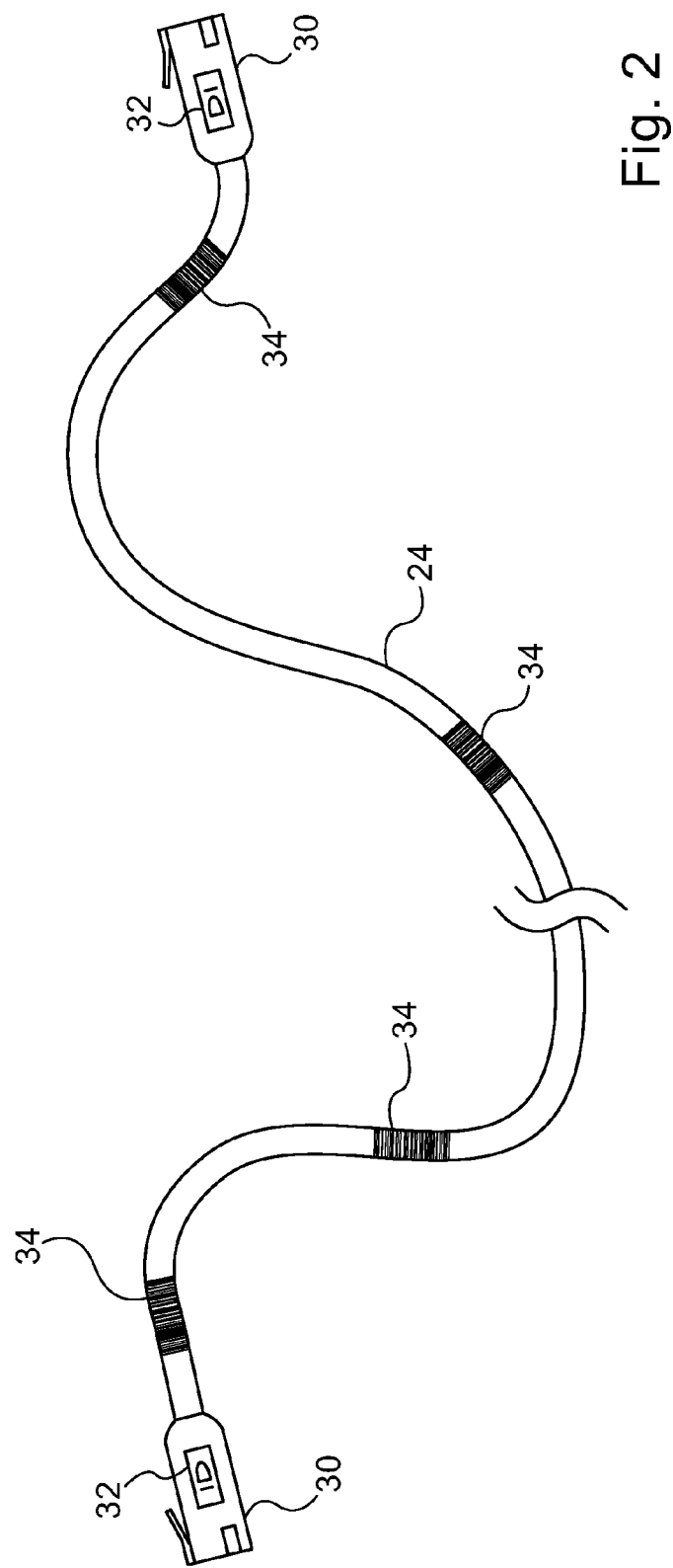
FIG. 2 is a schematic, pictorial illustration of a cable with identification labels disposed along its length, in accordance with an embodiment of the present invention.

To resolve this difficulty, cables 24 are provided with machine-readable labels, which are typically disposed along the cable at regular intervals (as shown in FIG. 2). User 26 applies a reader in a handheld device 28 to read the labels. For example, the labels may comprise barcodes, and device 28 may be a conventional smart phone, with suitable client software downloaded for the present purposes. The user takes a picture of the barcode of interest using the camera built into the smart phone, and the phone decodes the barcode to extract the unique identifier of the cable. The phone then communicates over the air (via a wireless local area network or via a cellular network, for example) with a fabric manager to obtain the desired connectivity information regarding this particular cable. Alternatively, device 28 may comprise any other suitable sort of handheld device, such as a tablet computer or a custom-built handheld terminal.

FIG. 2 is a schematic, pictorial illustration of cable 24 with identification labels 34 disposed along its length, in accordance with an embodiment of the present invention. Cable 24 comprises connectors 30 for connection to suitable sockets at the cable endpoints and contains electrical or optical conductors (not shown) for conveying communication signals between the endpoints. Connectors 30 may comprise, for example, SFP connectors/transceivers or any other suitable type of communication connector.

Each connector holds or is otherwise connected to an electronic component 32, such as a memory chip, containing the unique identification code of cable 24 in an electronic format that is readable by the equipment at the endpoints to which the connectors are connected. The code is "unique" in the sense that no two cables can have the same code. Typically, the manufacturer of the cables assigns the codes so as to ensure that no two cables leaving the assembly line will have the same code. Alternatively, the operator of network 20 may assign the codes and may program components 32 and mark the cables accordingly.

This same code is marked in a machine-readable format on labels 34 that are disposed along the length of the cable. The labels shown in the figure have the form of barcodes, which extend circumferentially around the cable. Alternatively, other sorts of machine-readable labels may be used, such as two-dimensional barcodes or radio-frequency identification (RFID) tags. Typically, as shown in the figure, labels 34 include end-labels located adjacent to connectors 30, while the remaining labels are distributed along the cable at regular intervals. The labels may conveniently be placed about 50 cm apart, so as to enable the user to easily find a label on any cable when needed, but alternatively other label spacings, larger or smaller, may be used. As a result of the arrangement shown in FIG. 2, most cables will have at least one label at a location that is at least 50 cm away from any of the connectors of the cable.

Figure 3:
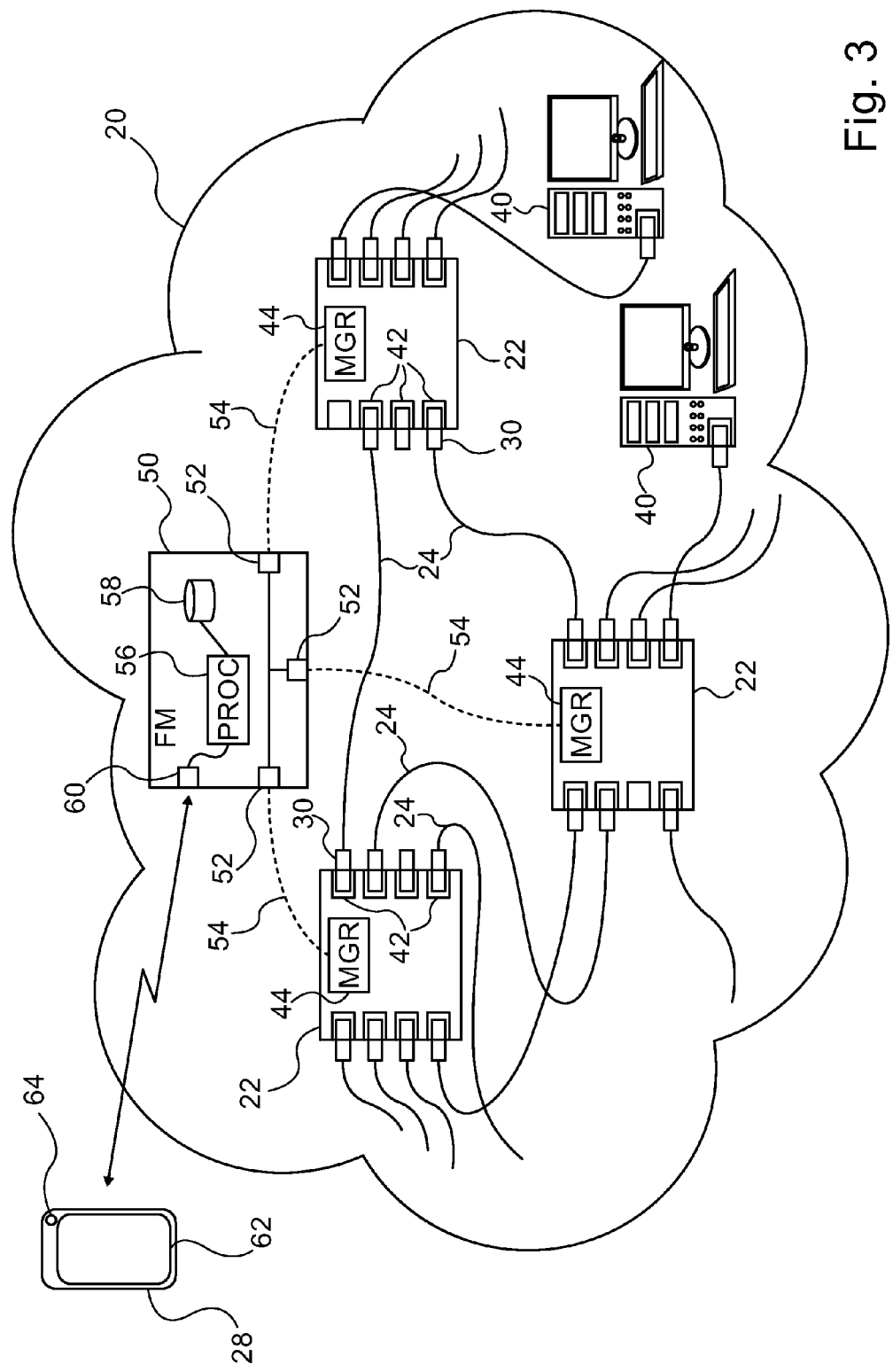
FIG. 3 is a block diagram that schematically illustrates a data network with a fabric manager, in accordance with an embodiment of the present invention.

FIG. 3 is a block diagram that schematically illustrates the operation of a fabric manager 50 in network 20, in accordance with an embodiment of the present invention. Network equipment 22 is assumed here to comprise switches, each having multiple ports 42, comprising sockets into which connectors 30 of cables 24 are inserted. The network equipment may also include hosts 40, as well as other sorts of network appliances. A local management agent 44 in equipment 22 collects identification information regarding the cables that are connected to ports 42 of the equipment by reading the identification code of each cable from electronic component 32 in the corresponding connector 30. The management agent is typically implemented in software running on a suitable processor, which may be embedded in or connected to the equipment.

Fabric manager 50 is shown in FIG. 3, for the sake of clarity, as a standalone unit, although it may alternatively be implemented as a software component running on an existing processor in a host or other item of equipment in network 20. The fabric manager comprises a processor 56 with a memory 58, in which the processor stores physical connectivity information regarding the cable connections in the network. Processor 56 runs under the control of suitable software, which may be downloaded to the processor in electronic form or, alternatively or additionally, stored in a tangible, typically non-transitory computer-readable medium, such as optical, magnetic, or electronic memory media.

Processor 56 is coupled to one or more communication interfaces 52, through which it sends and receives messages to and from management agents 44 in the various items of communication equipment in network 20. Fabric manager 50 communicates with agents 44 via management links 54, which may be either distinct physical links or logical links passing through cables 24 or a combination of the two types of links. Thus, in some embodiments, management links 54 may be arranged as a separate management network, which is physically independent of network 20. This solution is referred to as "out-of-band" management. In other embodiments, messages between fabric manager 50 and agents 44 are conveyed by "in-band" management data packets through cables 24 of network 20, as described further hereinbelow.

Management agents 44 send messages over links 54 to provide processor 56 with physical connectivity information regarding the identity of the cables 24 that are connected to the respective ports 42 of the equipment in network 20. Fabric connection may be difficult or impractical. In such a case, the user operates client device 28 to read the unique identifier of the cable in the vicinity of the disconnected end, and the client device reports this identifier to fabric manager 50. The fabric manager looks up the cable in memory 58 and sends the appropriate port information with respect to this cable to device 28. This information may include an identification of the item of equipment and port to which the disconnected end of the cable should be connected and/or the item of equipment and port to which the far end of the cable is connected.

Fabric manager 50 continues to communicate with agents 44 over links 54 during operation of network 20 in order to receive periodic connectivity updates. In this manner, processor 56 may detect, based on a message from one or more of the management agents, that there has been a change in a connection of a cable to a port in network 20—for example, that a cable has been disconnected or moved to a different port. In this case, the processor may issue an alert to device 28, so that the user of the device will be prompted to verify that the change in question was properly authorized and is in accordance with the applicable network operation and maintenance policy. Manager 50 will detect and report such changes even if they do not immediately affect the logical connectivity of higher-layer protocols in the network.

When managements links 52 are implemented by in-band messaging, the management data packets exchanged between fabric manager 50 and management agents 44 are typically of a packet type that is recognized and supported by the higher-layer protocols running on network 20. For example, when network 20 operates in accordance with InfiniBand™ specifications, Management Datagram (MAD) packets may be exchanged between management agents 44 and fabric manager 50. As another alternative, in an Ethernet network, Link Layer Discovery Protocol (LLDP) frames may be used for this purpose. MAD packets and LLDP frames are not normally used to carry physical connectivity information, but existing protocol features may be modified to support this functionality. For example, the LLDP frame may include the following organization-specific type-length-value (TLV) structure to communicate such information:

| Type | Length | Organizationally unique identifier (OUI) | Organizationally defined subtype | Organizationally defined information string |
|---|---|---|---|---|
| 127 | 9 bits | 24 bits (assigned to vendor by IEEE) | 8 bits | 0-507 octets (unique identification of equipment, port, and cable attached to the port) | manager 50 can provide this information over the air, via an interface 60, to users' client devices 28, which typically present the information to the user on a display 62. Client device 28 also comprises a suitable sensor 64, such as a camera or other type of barcode or RF scanner, which the user can operate to read the unique identifier from label 34 at any location along a cable of interest in network 20. Device 28 communicates the unique identifier over the air to fabric manager 50, which looks up the identifier in memory 58 and returns the physical connectivity information with respect to the cable to device 28.

One example of a situation in which fabric manager can be particularly helpful to user 26 is when the user discovers a cable end that is disconnected. Tracing the cable to find the location of the far end and manually identify its point of This TLV is shown by way of example, and other protocols and data structures may similarly be used for such purposes.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A cable for conveying communication signals between endpoints, the cable comprising:
connectors for respective connection to the endpoints; and a plurality of labels containing a code that uniquely identifies the cable in a machine-readable format, wherein the labels are disposed along a length of the cable and include at least one label at a location that is at least 50 cm away from any of the connectors of the cable.

2. The cable according to claim 1, wherein the at least one label comprises multiple labels disposed along the cable at regular intervals.

3. The cable according to claim 1, wherein the labels comprise a barcode.

4. The cable according to claim 1, wherein the plurality of the labels comprises end-labels that are disposed respectively adjacent to the connectors, and
wherein the cable comprises electronic components that are connected to the connectors and contain the code in an electronic format that is readable by equipment at the endpoints to which the connectors are connected.

5. Communication apparatus, comprising:
a memory;
a communication interface, configured to send and receive messages to and from respective management agents in multiple items of communication equipment having ports that are interconnected by cables in a network, each of the cables having a unique identifier; and
a processor, which is configured to communicate with the management agents via the communication interface so as to collect physical connectivity information with respect to the cables and the ports, to store the physical connectivity information in the memory, and to provide the physical connectivity information to a user of the apparatus.

6. The apparatus according to claim 5, wherein the physical connectivity information indicates, responsively to the unique identifier, which of the cables is connected to each of the ports.

7. The apparatus according to claim 6, wherein the processor is configured to detect, responsively to a message from the management agents, a change in a connection of a cable to a port in the network, and to issue an alert to the user of the change.

8. The apparatus according to claim 5, wherein the messages comprise management data packets, which are transmitted over the cables in the network in order to convey the physical connectivity information to the communication interface.

9. The apparatus according to claim 8, wherein the management data packets are selected from a group of packet types consisting of Link Layer Discovery Protocol (LLDP) frames and Management Datagram (MAD) packets.

10. The apparatus according to claim 5, and comprising a handheld client device, which is operable by the user to read the unique identifier of a cable in the network, to communicate the unique identifier over the air to the processor, and to receive over the air from the processor and to display the physical connectivity information with respect to the cable.

11. The apparatus according to claim 10, wherein the handheld client device is configured to read the unique identifier from a machine-readable label on the cable.

12. The apparatus according to claim 10, wherein the processor is configured to receive the unique identifier of the cable read in a vicinity of a first end of the cable, which is found to be disconnected while a second end of the cable is connected at a location unknown to the user, and wherein the physical connectivity information provided to the client device in response to the unique identifier comprises port information selected from a group consisting of a first port to which the first end of the cable should be connected and a second port to which the second end of the cable is connected.

13. A method for communication, comprising:
sending and receiving management messages between a computerized fabric manager and respective management agents in multiple items of communication equipment having ports that are interconnected by cables in a network, each of the cables having a unique identifier, so as to collect in the fabric manager physical connectivity information with respect to the cables and the ports;
storing the physical connectivity information in a memory of the fabric manager; and
providing the stored physical connectivity information to a user.

14. The method according to claim 13, wherein the physical connectivity information indicates, responsively to the unique identifier, which of the cables is connected to each of the ports.

15. The method according to claim 14, and comprising detecting, responsively to a message from the management agents, a change in a connection of a cable to a port in the network, and issuing an alert to the user of the change.

16. The method according to claim 13, wherein sending and receiving management messages comprises transmitting management data packets over the cables in the network in order to convey the physical connectivity information.

17. The method according to claim 16, wherein the management data packets are selected from a group of packet types consisting of Link Layer Discovery Protocol (LLDP) frames and Management Datagram (MAD) packets.

18. The method according to claim 13, and comprising reading, using a handheld client device, the unique identifier of a cable in the network, communicating the unique identifier over the air to the fabric manager, and receiving over the air from the fabric manager and displaying the physical connectivity information with respect to the cable.

19. The method according to claim 18, wherein reading the unique identifier comprises reading a machine-readable label on the cable.

20. The method according to claim 13, wherein reading the unique identifier comprises inputting the unique identifier of the cable in a vicinity of a first end of the cable, which is found to be disconnected while a second end of the cable is connected at a location unknown to the user, and wherein the physical connectivity information provided to the client device in response to the unique identifier comprises port information selected from a group consisting of a first port to which the first end of the cable should be connected and a second port to which the second end of the cable is connected.

* * * * *

UNITED STATES PATENT AND TRADEMARK OFFICE
CERTIFICATE OF CORRECTION

| | | |
|---|---|---|
| PATENT NO. | : 9,111,466 B2 | Page 1 of 1 |
| APPLICATION NO. | : 13/743364 | |
| DATED | : August 18, 2015 | |
| INVENTOR(S) | : Shachar Dor, Pazit Goldman and Eyal Baruch | |

It is certified that error appears in the above-identified patent and that said Letters Patent is hereby corrected as shown below:

On The Title Page, Item (73), Assignee name should be MELLANOX TECHNOLOGIES LTD..

Signed and Sealed this
Ninth Day of February, 2016

Michelle K. Lee
*Director of the United States Patent and Trademark Office*